United States Patent [19]

Mohr et al.

[11] Patent Number: 4,830,732
[45] Date of Patent: May 16, 1989

[54] REFORMING USING A BOUND ZEOLITE CATALYST

[75] Inventors: Donald H. Mohr, Albany; Charles R. Wilson, San Francisco, both of Calif.; Albert S. Behan, Bronxville, N.Y.; Robert L. Chiang, Mahwah, N.J.; Mark T. Staniulis, Peekskill, N.Y.

[73] Assignee: Chevron Research Company, San Francisco, Calif.

[21] Appl. No.: 141,657

[22] Filed: Jan. 7, 1988

[51] Int. Cl.⁴ ............................................. C10G 35/06
[52] U.S. Cl. ..................................................... 208/138
[58] Field of Search .......................................... 208/138

[56] References Cited

U.S. PATENT DOCUMENTS 4,456,527 6/1984 Buss et al. ............................ 208/138

Primary Examiner—Curtis R. Davis
Attorney, Agent, or Firm—S. R. La Paglia; T. G. De Jonghe

[57] ABSTRACT

Reforming to produce aromatics from aliphatics, using a bound zeolite catalyst containing a Group VIII metal such as platinum, has been found to be extremely sensitive to water, even at water concentrations as low as 3 ppm in the feed, unless certain catalysts having a low water sensitivity index are used. The water sensitivity index (WSI) is described and methods for making catalysts with a low WSI are described. The sulfur content of the feed to the reforming/aromatics production process is preferably below 50 parts per billion. The catalyst used in the reforming process is preferably a high crush strength catalyst and is preferably prepared by steps including treating L zeolite with a binding enhancement agent prior to binding with a binder such as silica, silica/alumina or alumina.

27 Claims, 1 Drawing Sheet

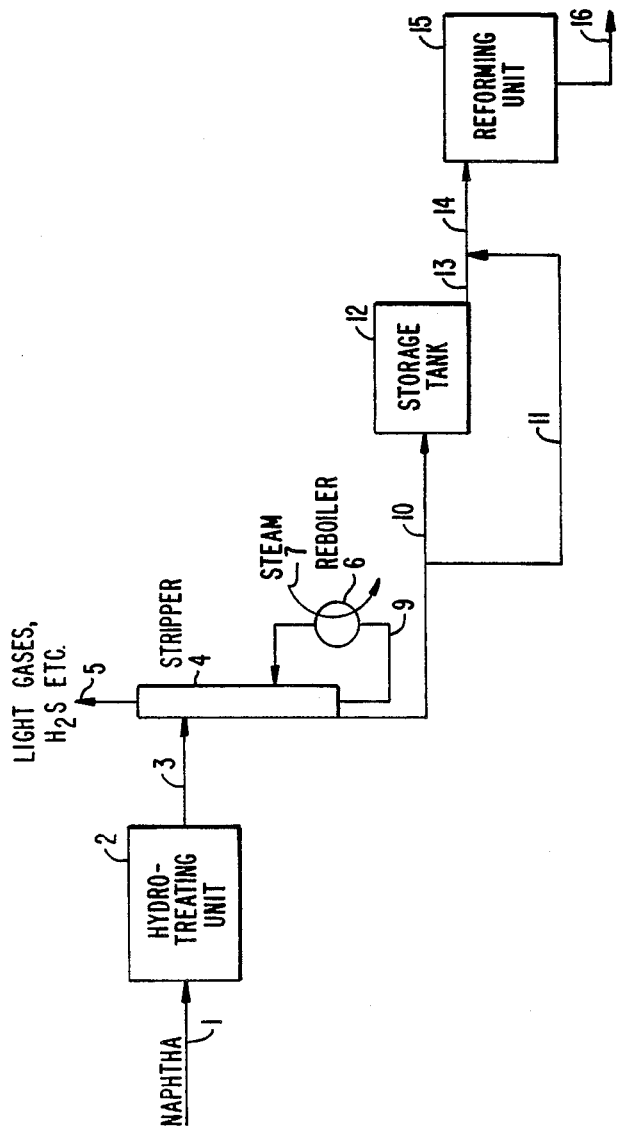
FIG._1.

REFORMING USING A BOUND ZEOLITE CATALYST

BACKGROUND OF THE INVENTION

The present invention relates to reforming, especially dehydrocyclizing, hydrocarbons to form aromatics using a large pore zeolite catalyst. Reforming embraces several reactions, such as dehydrogenation, isomerization, dehydroisomerization, cyclization and dehydrocyclization. In the process of the present invention, aromatics are formed from the feed hydrocarbons to the reforming reaction zone, and dehydrocyclization is believed to be the most important reaction in the present process.

U.S. Pat. No. 4,104,320, granted on Aug. 1, 1978, discloses that it is possible to dehydrocyclize paraffins to produce high octane aromatics with high selectivity using a monofunctional non-acidic large-pore zeolite catalyst. The catalyst consists essentially of a type-L zeolite having exchangeable cations of which at least 90% are sodium, lithium, potassium, rubidium or cesium and contains at least one Group VIII noble metal (or tin or germanium). In particular, catalysts having platinum on potassium form L-zeolite exchanged with a rubidium or caesium salt were claimed to achieve exceptionally high selectivity for n-hexane conversion to benzene. As disclosed in U.S. Pat. No. 4,104,320, the L zeolites are typically synthesized in the potassium form. A portion, usually not more than 80%, of the potassium cations can be exchanged so that other cations replace the exchangeable potassium.

Results as in U.S. Pat. No. 4,104,320 were also reported by J.R. Bernard at the 5th International Zeolite Conference in 1980. But, while it was clear that the improvement in selectivity was significant, particularly for $C_6$-$C_8$ paraffins and especially for $C_6$ paraffins, it was independently found that the catalyst had limited commercial potential. At conventional low pressure reforming conditions (about 200 psig) catalyst life was measured in hours and days, obviously an unacceptably short cycle life. Nonetheless, it had now been demonstrated that a platinum-containing alkali metal exchanged L-zeolite catalyst could achieve exceptionally high selectivity for the conversion of paraffins to aromatics. Advancing that discovery to a commercial catalyst became a new goal of catalytic reforming research.

An important step forward was disclosed in U.S. Pat. No. 4,434,311, granted on Feb. 28, 1984; U.S. Pat. No. 4,435,283, granted on Mar. 6, 1984; U.S. Pat. No. 4,447,316, granted on May 8, 1984 and U.S. Pat. No. 4,517,306, granted on May 14, 1985. These patents describe catalysts comprising a large pore zeolite exchanged with an alkaline earth metal (barium, strontium, or calcium, preferably barium) containing one or more Group VIII metals (preferably platinum) and their use in reforming petroleum naphthas. An essential element in the catalyst is the alkaline earth metal. Especially when the alkaline earth metal is barium, and the large-pore zeolite is L-zeolite, the catalysts were found to provide even higher selectivities than the corresponding alkaliexchanged L-zeolite catalysts disclosed in U.S. Pat. No. 4,104,320. Moreover, another equally significant benefit achieved by the use of an alkaline earth metal exchanged L-zeolite catalyst is that the catalyst retained its activity over a commercially acceptable cycle life.

The discovery that alkaline earth metal exchanged large pore zeolite reforming catalysts, especially the barium exchanged L-zeolite containing platinum, provide high selectivity even relative to the corresponding alkali metal exchanged L-zeolite containing platinum was surprising. These catalysts are all substantially "non-acidic" and therefore have been referred to as "monofunctional catalysts".

Having discovered a selective catalyst with an acceptable cycle life, commercialization seemed straightforward. Unfortunately, that was not the case. It was found that the high selectivity, large pore zeolite catalysts containing a Group VIII metal were unexpectedly susceptible to sulfur poisoning. U.S. Pat. No. 4,456,527 discloses this discovery. Specifically, it was found that the concentration of sulfur in the hydrocarbon feed should be at ultra-low levels, preferably less than 100 parts per billion (ppb), more preferably less than 50 ppb to achieve improved stability/activity for the catalyst used in the process.

After recognizing the sulfur sensitivity of these catalysts and determining the necessary level of sulfur control, commercialization again seemed feasible. However, as is sometimes the case with an emerging technology, another set back was encountered. It was found that certain of the large pore zeolite catalysts are surprisingly sensitive to the presence of water while under reaction conditions. Water greatly accelerates the rate of deactivation of some of these catalysts.

Water sensitivity is an extremely serious drawback. Water is produced at the beginning of each cycle when the catalyst is reduced with hydrogen. Water can also be produced during process upsets when water leaks into the reformer feed or the feed becomes contaminated with an oxygen-containing compound. If the catalyst must be protected from water, then expensive additional equipment is required.

SUMMARY OF THE INVENTION

According to the present invention, a process is provided for reforming aliphatic hydrocarbons to form aromatic hydrocarbons in a reaction zone which may be subjected to periodic exposure to more than 3 ppm water. The process comprises contacting the feed under reforming reaction conditions with a catalyst comprising a Group VIII metal, a large-pore zeolite and a binder, and wherein the catalyst has a water-sensitivity index less than 1.3, preferably less than 1.1.

The water-sensitivity index (WSI) is defined in more detail below. In a broad sense, it is a ratio of rates of the reforming reaction for a given catalyst at given reforming reaction conditions when the reaction is run essentially dry (for example, less than 3 ppm water) for a period of time versus when the reaction is run wet (for example, about 100 ppm water) for the same period of time. Unless otherwise indicated, ppm of water referred to herein is on a volume basis relative to the total feed (hydrocarbon and hydrogen gas) to the reactor at standard conditions (one atmosphere pressure and 60° F.).

Preferably, the WSI for the catalyst used in the process of the present invention is less than 1.1, more preferably, less than or equal to about 1.0.

According to a particularly preferred embodiment of the present invention, the catalyst selected for use in the process is one having the aforementioned low WSI and further, the feed to the process has an ultra low sulfur level, preferably less than 100 ppb by weight of sulfur, more preferably, less than 50 ppb by weight of sulfur.

We have found that when these two features are brought together, namely, ultra low sulfur content in the hydrocarbon feed and the use of a low WSI catalyst as defined herein, a particularly advantageous and reliable dehydrocyclization process can be attained.

According to another particularly preferred embodiment of the present invention, as discussed in more detail below, we have found that especially advantageous results are obtained when using a silica bound large pore zeolite, preferably a silica bound L zeolite. We have found the binding of the zeolite, particularly the preferred L zeolite, is markedly improved by using a binding enhancement agent such as aluminum nitrate to treat the zeolite prior to completion of the binding with silica.

The preferred catalysts used in the reforming process of the present invention have a crush strength of at least 1.8 lbs/mm, more preferably at least 2.0 lbs/mm and most preferably at least 2.2 lbs/mm. Use of a binding enhancement agent has been found by us to be effective in achieving the preferred high strength catalysts for use in the present process. Crush strength is measured by the flat plate crush method. Catalyst particles are dried to constant weight at 950° F. in air. Their length is measured in mm. and the weight necessary to initiate cracking of the particle is measured as it lays on its side on one flat plate and another flat plate is brought into contact with it. The crush strength is then calculated by dividing the weight by the length for at least ten each of statistically sampled extrudates. Typical lengths for the particles are from 2.0 to 0.7 cm.

The process of the present invention is advantageous both when the reforming reaction is operated at water levels in the feed greater than about 3 ppm water and also, when it ordinarily is operated dry but is subject to periodic upsets of greater than about 3 ppm water. The "upsets" causing water to enter a normally dry reaction zone can occur easily and are relatively commonplace.

Examples of such upsets often occur in reforming units where the feed to the reformer is obtained from a hydrotreating unit, and the hydrotreating unit includes a stripping column which is operated using a steam-heated reboiler. The steam-heated reboiler can introduce water into the hydrocarbon feed if minute leaks develop in the reboiler piping or headers, etc. More generally, water can be introduced to the hydrocarbon feed when heat is added to the feed by heat exchange with water or steam.

Another possible source of water is the start-up of the catalytic operation during which time water is formed as the catalyst is reduced with hydrogen and when water may be desorbed from the catalyst or the reactor internals.

Likewise, another possible source of water is catalyst regeneration. After a period of time onstream, the catalyst becomes fouled with coke and it is necessary to burn the coke off the catalyst. During the process of burning the coke, water is formed. This water may be adsorbed at various places in the reaction system, including reactor internals and the catalyst itself. Then, when the process is started up again, the water is desorbed and recycles with the recycle hydrogen gas to the dehydrocyclization reaction zone.

Because there is a high probability of water from one or more of the sources mentioned above, or from other unspecified sources, we have found that it is advantageous when reforming is carried out using a bound largepore zeolite catalyst, to use a catalyst which has a low water-sensitivity index.

Thus, among other factors, the present invention is based on our discovery that catalytic reforming to produce aromatics carried out using a bound large-pore zeolite catalyst is surprisingly disadvantageously effected by the presence of even small amounts of water, such as about 3 ppm to 20 ppm water, whereas in other reforming processes, for example, those using bifunctional catalysts, such as platinum or platinum rhenium on halogenated alumina, the presence of 3 to 20 ppm water, is frequently deemed advantageous, or at least not substantially detrimental. In this regard, see Nevison et al, NPRA Paper AM-74-20, 72nd Annual Meeting, Mar. 31-Apr. 2, 1974.

Further, according to a preferred embodiment, the present invention is based on our finding that a highly advantageous reforming process for aromatics production, especially in terms of run length and activity, is achieved by using an ultra low sulfur feed and a low WSI catalyst. Still further, according to another preferred embodiment, the present invention is based on our findings that highly advantageous results are achieved in terms of run length and performance after catalyst regeneration and/or after exposure to small amounts of sulfur, by carrying out the reforming process using a silica bound catalyst, preferably an L zeolite silica bound catalyst wherein the crush strength of the catalyst has been improved by treatment of the zeolite with a binding enhancement agent, such as aluminum nitrate, prior to binding the zeolite with silica.

The large-pore zeolite which is used in the process of the present invention is a zeolite having an effective pore opening of 6 to 15Å in diameter. Particularly preferred zeolite for use in the catalyst used in the process of the present invention are type-L zeolites.

Preferred L-zeolite compositions for use in the catalyst which is employed in the process of the present invention are alkaline earth metal exchanged L-zeolites, especially calcium, strontium or barium exchanged L-zeolite. Still more preferably, the alkaline earth metal is barium.

We have found that bound zeolite catalysts are more susceptible to the effects of water during reforming to produce aromatics than unbound zeolite catalysts. While the problem of water sensitivity does not tend to occur when using a catalyst selected from various of the catalysts comprising Group VIII metal on unbound zeolite, such unbound catalysts are usually not practical for commercial use.

In the present process a bound zeolite catalyst is used. We have found that preferred binders for the catalyst used in the process of our invention are silica, alumina, and silica/alumina combinations. Other inorganic refractory oxides may be used, but it is critical in our process that the water-sensitivity index requirement of the present invention be satisfied. We especially prefer silica binders.

We have found that the L zeolite, particularly the potassium form L zeolite, has a negatively charged surface in the pH range of 3 to 11. We have also found that the binding of the L zeolite to the preferred silica binder can be enhanced by modifying the zeolite surface to reverse the negatively charged surface of the zeolite. Reversing the negatively charged surface and enhancing the binding can be done with a cationic species, such as Al, La or Zr. Nitrate, chloride and sulfate salts of the indicated cationic species can be effectively used, such as alumina hydroxy-nitrate (AHN), aluminum chlorhydrol (ACH), aluminum nitrate (Al(NO$_3$)$_3$), aluminum sulfate (Al$_2$(SO$_4$)$_3$), and lanthanum nitrate (La(NO$_3$)$_3$). Thus, various metal salts can be used, provided they reduce the negative charge on the zeolite surface and enhance the binding so as to improve crush strength of the bound catalyst. Al(NO$_3$)$_3$ is a particularly preferred metal salt for this purpose. We believe that aluminum sulfate is not preferred in the reforming process of the present invention because of the potential of catalyst poisoning from sulfur from the sulfate.

Alkali metal ions have been used as crosslinking agents in silica binding of zeolites, but such use is detrimental to catalytic activity in many instances. In the present invention, we have found the use of an aluminum compound such as aluminum nitrate is not detrimental to catalytic activity. We believe the aluminum compounds can reverse the charge on the zeolite surface and allow for mutual attraction between the zeolite and the negatively charged silica binder and consequent enhanced binding integrity or strength.

In preparing the silica-bound L zeolite catalyst in accordance with preferred embodiments of the present invention, either the zeolite is treated in advance with a binding enhancement metal salt or the zeolite is co-mulled in the presence of the metal salt added to the muller followed by addition of the silica binder. In the embodiment where the zeolite is separately prepared with the binding enhancer, binding enhancer such as an aluminum salt can be mixed with the zeolite in a slurry, followed by pH adjustment to precipitate aluminum species on the surface of the zeolite. The modified zeolite is separated from the slurry, combined with the silica binder, and either extruded or spray dried to form product. The product can be subsequently treated, as with platinum addition and other steps as described elsewhere herein, to produce a reforming catalyst.

Electrophoretic measurements preferably are carried out on the zeolite to determine the amount of binding agent enhancer to achieve strong binding between the zeolite and the binder, such as the silica binder. Preferably the amount of binding agent enhancer is adjusted so that the zeolite surface will be approximately at the isoelectric point (IEP) or slightly past this point to the positive side.

We have found that the moisture content of the L zeolite-binder material to be extruded to form the catalyst base preferably is controlled to a low level in order to achieve good crush strength on the product. For the L zeolite-silica product material, preferably the moisture of the material prior to extrusion is controlled to about 36.5, plus or minus about 2 or 3%, L.O.I. (loss on ignition), more preferably 36.5 wt. % L.O.I. plus or minus 0.5%. To achieve this relatively low moisture content, it is preferred to reduce the moisture content of the L zeolite used to form the L zeolite-silica mixture to less than 15% L.O.I., more preferably less than 13% L.O.I. In experimental work in this area we obtained suitably dried L zeolite by drying L zeolite powder at 100° C. for 16 hours to reduce the L.O.I. from 21.75 wt. % to less than 8 wt. %.

The catalyst used in the process of the present invention can be prepared in various manners, but, again, it is critical that the preparation be such that the catalyst have the aforestated low-water sensitivity index. When using the particularly preferred silica binder, we have found that overwashing of the silica-bound catalyst can induce unwanted water sensitivity to the catalyst. When using an alumina binder we have also discovered that the alumina should not be subjected to extensive peptization with acid during binding as such peptization was found by us to also introduce water sensitivity to the catalyst.

In our examples below, we illustrate alternate preparations for the catalyst, which can be followed to achieve the low water-sensitivity index catalyst required for use in the dehydrocyclization process of the present invention. Testing the prepared catalyst for water-sensitivity index is not fundamentally difficult. The watersensitivity test is described in more detail below.

According to a preferred embodiment of our invention, the base for the catalyst employed is an L-zeolite bound with silica, alumina or silica-alumina, wherein the L-zeolite is preferably in the potassium or barium form, more preferably a potassium form L zeolite which has been barium ion-exchanged, and whose last processing before application of platinum is contacting (washing) with water at a pH preferably above 7, more preferably above 8, and still more preferably above 9. Preferably, the upper limit of the pH in this wash step does not exceed 13.5, more preferably 12, and still more preferably 11. The water in equilibrium with the catalyst base for this wash preferably contains an alkali or alkaline earth metal in a concentration of greater than 50 ppm by weight, based on the water, or more preferably 100 to 250 ppm and most preferably 150 to 170 ppm. Preferred alkali and alkaline earth metals for this purpose are potassium, sodium and barium. Potassium is particularly preferred. The alkali or alkaline earth metal can be added to the wash water, or the desired equilibrium amount in the wash water may be achieved through such component being present in the zeolite or bound zeolite prior to washing. The pH and ion concentration conditions referred to are those in the wash water when the final wash step is being finished. After washing, preferably the zeolite base is then dried, calcined, platinum-loaded and recalcined.

According to a particularly preferred embodiment of the present invention, the base for the catalyst employed is a barium exchanged L-zeolite bound with silica and the bound zeolite is washed and platinum-loaded as described in the preceding paragraph. Preferably the L-zeolite is contacted with a binding enhancement agent, such as aluminum nitrate, prior to binding the zeolite with silica.

According to another preferred embodiment of the present invention, the catalyst employed is a large pore zeolite, more preferably, a barium exchanged L-zeolite, bound with alumina.

For catalysts prepared using an alumina binder, preferably the alumina is subjected to only mildly acidic peptization. For example, we have found in several instances that the peptization was too severe when the alumina was treated with greater than about 0.15 grams of nitric acid per gram of Al$_2$O$_3$ (anhydrous). Preferably the alumina component of the alumina-bound catalyst used in the present invention is prepared under less severe peptization conditions, such as less than 0.10 grams of nitric acid, or equivalent, per gram of alumina. However, the effect of acid on the alumina is a complex phenomena and in some instances we have found higher amounts of acid do not result in a water sensitive catalyst.

Preferred Group VIII metals for preparation of the catalyst used in the present invention are platinum and palladium. Platinum is particularly preferred. We have found that an advantageous method of preparing a low WSI catalyst for use in the process of the present invention comprises introducing the platinum component to the zeolite or bound zeolite support by "pore fill". Pore fill is a technique known in the art. In the pore fill method the catalyst is wetted with a Group VIII metal component, such as platinum component, for example, a solution of platinum tetraamine chloride, and the platinum component is adsorbed onto the zeolite.

In contrast to using an ion-exchange method, an excess of platinum is not used when using the pore fill method. Also, the catalyst does not require washing after the pore fill addition of the platinum component. It is preferred to make the catalyst used in the present invention by pore fill addition of the platinum component followed by drying and calcining without intervening water wash after the pore fill.

The Group VIII metal component, such as the platinum component, can be added to the zeolite prior to binding the zeolite, but more preferably, for the catalyst used in the process of the present invention, the Group VIII metal component is introduced to the catalyst after the zeolite has been bound.

The present invention encompasses reforming and especially dehydrocyclization under conditions and with catalysts as described herein, and encompasses the catalysts per se for use in reforming and especially dehydrocyclization.

DETAILED DESCRIPTION

Extrudate catalysts comprising a large pore zeolite having an alkaline earth metal incorporated into the zeolite and containing a Group VIII metal can be prepared according to techniques known in the art. These techniques usually involve four basic steps or procedures. The order in which these steps are carried out is not generally critical, although there are preferred sequences. The four basic steps or procedures are: (1) ion-exchange of an alkali metal large pore zeolite with an alkaline earth metal; (2) calcination; (3) impregnation with a Group VIII metal; and (4) binding the zeolite to prepare an extrudable mixture.

As indicated, these four steps can be carried out in a variety of different orders. For example, U.S. Pat. No. 4,458,025 describes the preparation of an extrudate catalyst using the four basic procedures in the order: ion-exchange, binding, high temperature calcination, impregnation and low temperature calcination. In the preferred embodiment, the binding operation is carried out by mixing together an ion-exchanged zeolite with a non-acidic alumina. The bound mixture is extruded. Then in a high temperature calcination, the extrudate is heated to at least 1000° F. for one to two hours. The extrudate is ion-exchanged, washed and calcined. The calcined extrudate is then impregnated with a Group VIII metal. Thus, the impregnation procedure follows the high temperature calcination. Following impregnation, the catalyst is again calcined but at a much lower temperature, about 500° F.

U.S. Pat. No. 4,434,311 is directed to a dehydroisomerization reaction using a large pore zeolite catalyst. The catalyst can be prepared in either of two preferred ways. The first way uses the four basic procedures in the order: ion-exchange, calcination, impregnation, calcination, binding and low-temperature calcination. This method has the advantage that since impregnation precedes binding, all of the metal is impregnated unto the zeolite and none unto the inorganic oxide binder. The second way uses the same four procedures, but in the order: (a) binding and calcinatiion, (b) ion-exchange and calcination, (c) impregnation, (d) calcination. This method has as its advantage the fact that the bound extrudate can be easily separated from the ion-exchange and impregnation solutions. We have found that the catalyst used in the dehydrocyclization process of the present invention is preferably prepared in accordance with this second way, and preferably with three calcination steps. The preferred calcination steps follow binding, ion-exchange, and impregnation.

U.S. Pat. No. 4,547,472 discloses a method to prepare a catalyst using a double ion-exchange procedure. In one embodiment, the method uses the four basic procedures in the order: ion-exchange, calcination, ion-exchange, calcination, impregnation, calcination, binding, and calcination. In a second embodiment the order is: binding, calcination, ion-exchange, calcination, ion-exchange, calcination, impregnation, and calcination.

As a final example of the numerous ways to order the four basic catalyst preparation steps or procedures, U.S. Pat. No. 4,579,831 discloses a method using the procedures in the order: binding, calcination, impregnation, and calcination. A separate ion-exchange procedure is omitted because the binding agent contains an alkali or alkaline earth metal aluminate. Thus, ion-exchange can take place during the binding procedure as a simultaneous step.

In view of the many different ways illustrated by the patents recited above to prepare an extrudate catalyst, it was surprising to discover that some of the final catalysts are water sensitive. The state of the art prior to this discovery led us to expect that silica and alumina bound catalysts would not be inherently different. It was thought that the selection of a binding agent and the manner of its use were choices from among equivalents without substantive effect on the final catalyst.

According to a preferred embodiment of the present invention, the catalyst used in our reforming process is prepared as follows.

The zeolite is bound using silica, alumina or silica-alumina, most preferably silica. Binding the catalyst involves mixing the zeolite, the binder and preferably a binding enhancement agent to form an extrudable paste.

Alternatively, the binding agent can be used to treat the zeolite before adding the binder. In any of these alternatives, the zeolite is contacted with the binding enhancement agent prior to completion of the binding. After the mixing of the zeolite and binder, the catalyst base material is extruded. Then the extrudate is calcined.

Next the bound zeolite extrudate is preferably exchanged with an alkali or alkaline earth metal, more preferably the latter, and most preferably, barium. A barium exchanged L-zeolite is exemplified below. After the exchange, the catalyst is washed, preferably as previously described. The washed catalyst is then recalcined. This calcination is preferably done at about 1000° F. to 1200° F., more preferably about 1100° F., in air for at least one hour.

Next the catalyst is impregnated with a platinum component using a pore fill method. This is believed advantageous in reducing the likelihood of subsequent water sensitivity when the catalyst is used in dehydrocyclization. The pore filled catalyst is then dried and then calcined.

Preferably, the calcination of the impregnated catalyst is carried out at 400 to 600° F., more preferably 500 to 550° F. Preferably, this calcination is carried out in an air/steam mixture, for example, a 50% air/steam mixture, flowing over the catalyst, as described in commonly assigned U.S. Pat. No. 4,608,356, which disclosure is incorporated herein by reference.

The zeolite used in the reforming process of the present invention is a large-pore zeolite having an effective pore diameter of 6 to 15Å as mentioned above. Among the large-pore zeolites which are preferred for use in the catalyst used in the process of the present invention, are zeolite L, zeolite X and zeolite Y. These preferred zeolites have apparent pore sizes in the range of about 7 to 9Å in diameter.

Zeolite X is a synthetic crystalline zeolitic molecular sieve which may be represented by the formula:

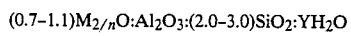
(0.7–1.1)M$_{2/n}$O:Al$_2$O$_3$:(2.0–3.0)SiO$_2$:YH$_2$O wherein M represents a metal, particularly alkali and alkaline earth metals, n is the valence of M, and Y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

The chemical formula for zeolite Y expressed in terms of moles oxides may be written as:

(0.7–1.1)Na$_2$O:Al$_2$O$_3$:xSiO$_2$:yH$_2$O wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

The most preferred zeolite for use in preparing the catalyst used in the dehydrocyclization process of the present invention is zeolite L. The chemical form for zeolite L may be represented as follows:

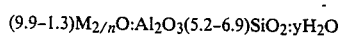
(9.9–1.3)M$_{2/n}$O:Al$_2$O$_3$(5.2–6.9)SiO$_2$:yH$_2$O wherein M designates a cation, n represents the valence of M, and Y may be any value form 0 to about 9. Zeolite L, its x-ray diffraction pattern, its properties, and method for its preparation are described in detail in U.S. Pat. No. 3,216,789. Zeolite L has been characterized in "Zeolite Molecular Sieves" by Donald W. Breck, John Wiley and Sons, 1974, (reprinted 1984) as having a framework comprising 18 tetrahedra unit cancrinite-type cages linked by double six rings in columns and cross-linked by single oxygen bridges to form planar 12-membered rings. The hydrocarbon sorption pores for zeolite L are reportedly approximately 7Å in diameter. The Breck reference and U.S. Pat. No. 3,216,789 are incorporated herein by reference, particularly with respect to their disclosure of zeolite L.

The various zeolites are generally defined in terms of their X-ray diffraction patterns. Several factors have an effect on the X-ray diffraction pattern of a zeolite. Such factors include temperature, pressure, crystal size, impurities and type of cations present. For instance, as the crystal size of the type L-zeolite becomes smaller, the X-ray diffraction pattern becomes somewhat broader and less precise. Thus, the term "zeolite L" includes any of the various zeolites made of cancrinite cages having an X-ray diffraction pattern substantially the same as the X-ray diffraction patterns shown in U.S. Pat. No. 3,216,789. Type L-zeolites are conventionally synthesized in the potassium form, that is, in the theoretical formula previously given, most of the M cations are potassium. M cations are exchangeable so that a given type L-zeolite, for example, a type L-zeolite in the potassium form, can be used to obtain type L-zeolites containing other cations by subjecting the type L-zeolite to ion-exchange treatment in an aqueous solution of an appropriate salt or salts. However, it is difficult to exchange all the original cations, for example, potassium, since some cations in the zeolite are in sites which are difficult for the reagents to reach. Preferred L zeolites for use in the present invention are those synthesized in the potassium form. Preferably the potassium form L zeolite is ion exchanged to replace a portion of the potassium, most preferably with an alkaline earth metal, barium being an especially preferred alkaline earth metal for this purpose as previously stated.

The inorganic oxide carrier binder for the catalyst used in the process of the present invention can be selected from various materials as stated above. The preferred amounts of binder are from 5 to 90 wt. % of the finished catalyst, more preferably, from 10 to 50 wt. % and still more preferably, from 10 to 30 wt. %.

It is critical in the process of the present invention that the catalyst used has a low water-sensitivity index as previously indicated.

The water-sensitivity index test was developed by us to rapidly test the effect of water on the fouling behavior of reforming catalyst. The water-sensitivity index (WSI) is determined as follows. The activity of the catalyst is measured in a microreactor under typical reforming conditions. Measuring the WSI requires two separate runs in the microreactor.

The first run is about 40 hours long with no added water. The feed for this first run is hydrofined by known methods such that substantially all the water and oxygen-containing compounds are removed. Therefore, the water concentration in the mixture of feed and hydrogen entering the reaction zone is less than about 3 ppm.

The second run is carried out in the same manner as the first from 0 to 20 hours onstream. Then, between 20 to 40 hours onstream, water is added in an amount sufficient to give about 100 ppm water by volume in the mixture of hydrocarbon feed and hydrogen entering the reaction zone of the microreactor. As an example, the water may be added to the incoming hydrogen with a Dynacal permeation device supplied by Vici Metronics.

The activity (as defined hereinbelow by the pseudo first-order rate constant, k) at 40 hours on stream for the first run is divided by the activity at 40 hours on stream for the second run to generate the WSI.

Referring now more specifically to the conditions for the two test runs, catalyst is crushed and screened to a size of 24/80 mesh. An amount of catalyst containing $4.42 \times 10^{-3}$g of platinum is loaded into a ¼" stainless steel reactor. The catalyst is then reduced in hydrogen flowing at a rate of 500 cc/min. for one hour at 900° F. then a hydrocarbon feed is introduced at a rate of 6 ml/hour at a pressure of 100 psig at 920° F. with hydrogen flow sufficient to give a mole ratio of hydrogen to feed hydrocarbon of 6.0. The reaction products are analyzed by a gas chromatograph with a capillary column and a flame ionization detector.

The hydrocarbon feed is a light naphtha with a boiling range of 160° F. to 260° F., a sulfur content less than 0.03 ppm by weight, a nitrogen content of less than 0.1 ppm by weight, an aromatics plus substituted cyclohexanes content totaling approximately 12.5 mole %, a content of paraffin plus substituted cyclopentanes with greater than six carbon atoms totaling approximately 81.2 mole %, a content of paraffin plus cyclopentane with five or fewer atoms totaling approximately 6.3 mole %, and an average molecular weight of approximately 95.

The aromatization reactions are characterized by calculating conversion and selectivity as described below.

The feed contains 12.6 mole % of combined aromatics and cyclohexanes. It is assumed that the aromatics do not react and that the cyclohexanes are dehydrogenated to form aromatics with 100% conversion and 100% selectivity. The feed also contains 81.2 mole % of paraffins and substituted cyclopentanes containing at least six carbon atoms. These compounds form a "pool" of reactants that can be dehydrocyclized to form aromatics by contact with the catalyst.

The pool conversion is defined as the fraction of this pool of reactants that is converted to either aromatics or compounds with fewer than 6 carbon atoms. (See equation 1).

$$\text{Pool Conversion, \%} = \frac{\text{Moles reactants per mole of feed} - \text{Moles of reactants left in product per mole of feed}}{\text{Moles of reactants per mole feed}} \times 100 \quad (1)$$

where reactants are the pool of paraffins and cyclopentanes having at least 6 carbon atoms. Thus, pentane, aromatics and cyclohexanes are excluded.

The pool selectivity is defined as the fraction of converted reactants that end up as aromatics. (See equation 2).

$$\text{Pool Selectivity, \%} = \frac{\text{Moles aromatics in the product per mole of feed} - \text{Moles of aromatics and cyclohexanes in the feed per mole of total feed}}{\left(\frac{\text{Pool conversion, \%}}{100}\right)\left(\text{Moles of reactants per mole of feed}\right)} \times 100 \quad (2)$$

where reactants are the pool of paraffins and cyclopentanes having at least 6 carbon atoms.

The conversion and selectivity are used to calculate a "pseudo first-order" rate constant for aromatics productions as shown in Equation (3). Although the rate of aromatization cannot be modeled exactly by this first-order rate expression, it is a useful approximation:

$$k = \left(\frac{\text{selectivity, \%}}{100}\right) \ln\left(1 - \frac{\text{conversion, \%}}{100}\right) \quad (3)$$

The rate constant after 40 hours onstream without any water addition is denoted $k_{dry}$. The rate constant calculated using conversion and selectivity results for the end of the second run, that is, the run described above having 20 hours onstream without water addition followed by 20 hours onstream with water addition, is denoted $k_{wet}$. The water-sensitivity index (WSI) is defined by equation (4):

$$WSI = \frac{k_{dry}}{k_{wet}} \quad (4)$$

DRAWING

The drawing is a simplified schematic flow sheet showing a reforming unit and upstream feed treatment facilities.

Referring in more detail to the drawing, naphtha is fed via line 1 to hydrotreating unit 2. In the hydrotreating unit, in addition to other reactions, organic sulfur compounds are converted to hydrogen sulfide and hydrocarbons. The hydrotreated naphtha is removed via line 3 and fed to stripper 4.

In stripper 4 light gases and hydrogen sulfide are stripped out of the hydrotreated naphtha and removed overhead via line 5. Heat is added in reboiler 6. The heat source for the reboiling is steam introduced to the reboiler via line 7. Typically, the steam would be in the "tube side" of the reboiler but the steam may on occasion leak through to the "shell side" where the naphtha is being heated for reboiling.

The stripped naphtha is removed via line 8 and passed to storage tank 12 via lines 9 and 10. The storage tank is another potential source of water contamination in the reforming unit.

Naphtha is fed to reforming unit 15 either "directly" from the stripper via piping, shown schematically by lines 9, 11 and 14, or "indirectly" via storage tank 12 and then lines 13 and 14.

In reforming unit 15, the naphtha is reformed to form aromatics. The naphtha feed is a light hydrocarbon, preferably boiling in the range of about 70° F. to 450° F., more preferably about 100 to 350° F. The naphtha feed contains aliphatic or paraffin hydrocarbons and these aliphatics are converted, at least in part, to aromatics in the reforming reaction zone. Dehydrocyclization is believed to be the most important reaction.

The feed preferably contains less than 100 ppb sulfur and more preferably, less than 50 ppb sulfur. If necessary, a sulfur sorber unit is employed between units 4 and 15 to remove remaining small amounts of sulfur in the feed prior to contacting the feed with the waterinsensitive catalyst used in the process of the present invention. We have found that best results are achieved in our reforming process if the sulfur is maintained at ultra low levels as we specified above, and also if the catalyst employed is a bound large-pore zeolite with the aforestated low water-sensitivity index.

Preferred reforming process conditions include a temperature between 750 and 1000° F., more preferably between 850 980° F.; and a pressure between 0 and 400 psig, more preferably between 50 and 300 psig; a recycle hydrogen rate sufficient to yield a hydrogen to hydrocarbon mole ratio for the feed to the reforming reaction zone between 0.1 and 20, more preferably between 0.5 and 10; and a liquid hourly space velocity for the hydrocarbon feed over the reforming catalyst of between 0.1 and 10, more preferably between 0.5 and 5.

A product stream rich in aromatics is withdrawn via line 16 as schematically indicated on the drawing.

EXAMPLES

Example 1

Alumina Bound Catalyst - Not of this Invention

To 478 grams of pseudo boehmite alumina (340 grams $Al_2O_3$) was added a mixture of nitric acid and water. 0.42 grams of nitric acid per gram of alumina was used to peptize the alumina and the final loss on ignition (LOI) of this mix was 39%. The peptized alumina paste was mulled with 1360 grams of potassium L-zeolite (anhydrous basis) and the LOI adjusted with water to 39%. After mulling, the mix was extruded, dried and calcined at 500° C. with flowing dry air. Barium ion-exchange was performed at a ratio of 10 cc of 0.3 molar barium nitrate per anhydrous gram of extrudate at 180° F. for up to three hours. This barium ion-exchanged material was washed to a potassium ion concentration in the final wash of 160 ppm (a pH between 8 and 9) and calcined. This material was then calcined in air at 1100° F. for at least one hour.

The bound and barium exchanged extrudate was then pore-fill impregnated to 0.64% by weight platinum and calcined for about one hour in a 50% steam/air environment between 500 and 550° F.

Example 2

Alumina Bound Catalyst - Not of this Invention

A similar catalyst was prepared as in Example 1, except that only 0.14 grams nitric acid per gram alumina was used in the peptization step.

Example 3

Alumina Bound Catalyst in Accord with this Invention 1600 grams of potassium L-zeolite (anhydrous basis) was charged to a sigma blade mixer (bread dough type) and the LOI was adjusted to 29% with water. In a separate sigma blade mixer 563 grams of pseudo boehmite alumina (400 grams of $Al_2O_3$) was peptized with a mixture of nitric acid and water. 0.06 grams of nitric acid per gram of $Al_2O_3$ was used and the LOI of this mix was 58%. The two mixtures were combined, blended and adjusted with water to a final LOI of 43%. The paste was extruded, dried and calcined in flowing dry air at 480° C. The bound zeolite was then carried forward to a finished catalyst as in Example 1.

Example 4

Alumina Bound Catalyst in Accord with this Invention

This catalyst was prepared as in Example 3, except that the calcination of the bound zeolite was done for one hour at a temperature of 593° C.

Example 5

Silica-Bound L Zeolite

Potassium form L zeolite was dried at 100° C. for 16 hours to reduce the L.O.I. from 21.75% to less than 8% by weight. A 2 molar solution of aluminum nitrate was used as a binding enhancement agent. The aluminum nitrate was used in a ratio of 0.133 ml of 2 molar solution per anhydrous gram of L zeolite powder. Preferably this solution is thoroughly blended before the next step of addition of the silica sol.

To accomplish thorough blending, approximately ¼ of the 2 molar solution was added to the zeolite in a muller at 5-minute intervals over a 15-minute period. After the final addition of the binding enhancement agent, Ludox TM silica sol is then added to the mull followed by water addition to bring the moisture to the preferred extrusion level of about 36.5% L.O.I.

Many samples were prepared using the above general procedure, but using different binding enhancement agents and some with no binding enhancement agent, to determine the affect on crush strength, extrudability, operational feasibility (e.g., corrosivity, etc.), and catalyst performance (after Pt impregnation, etc.). Preferred results were attained, particularly considering catalyst performance and crush strength, using aluminum nitrate.

A summary of the aluminum nitrate preparation is as follows on a gram basis for an 80% by weight L zeolite bonded with 20% silica.

| Ingredients: Anhydrous | | As Is |
|---|---|---|
| K-L zeolite powder (6.81 wt. % L.O.I.) | 2200 | 2361 |
| Ludox TM * AS-40 (40 wt. % silica) | 550 | 1375 |
| 2 molar aluminum nitrate | — | 375 |
| Water added to mull to extrude, ml | — | 275 |

Procedure:

Add K-L to muller, mull for 10 minutes.
Add the 2 molar aluminum nitrate solution as described above.
Let mull for 15 minutes, then add Ludox TM (binder).
Let mull for 10 minutes, then add water to bring the mull moisture up to the calculated L.O.I. of 36.5 wt. %.
Extrude after mull has broken (achieved proper rheological properties).
Dry.
Calcine to 600° C.
The extrudates were calcined as follows:
Room temperature to 220° C. hold 90 minutes
220° C. to 600° C. hold 2 hours
600° C. to room temperature Ludox TM AS-40 is a silica sol available from Du Pont and containing 40 wt. % silica stabilized by ammonium ion in water.

Example 6

Silica-bound Catalyst - Not of this Invention

An extrudate was formed utilizing 20% by weight of silica derived from Ludox TM AS-40 silica and 80% potassium L zeolite extrudate. The following steps are followed: (1) binding enhancement agent, $Al(NO_3)_3 \cdot 9H_2O$, is dissolved in water at 2 molar concentration and added to potassium form L-zeolite until the ratio of the above salt to anhydrous L-zeolite is about 10 wt. percent; (2) following mixing, sufficient Avicel cellulos extrusion aid is added to equal 1.25 wt. percent of the anhydrous zeolite; (3) again, following mixing, sufficient Ludox AS-40 is added to make an 80% zeolite, 20% silica binder mixture on an anhydrous basis; (4) additional water as necessary is added. The paste is further mixed and extruded. This extrudate was calcined at 705° C. in flowing air.

This extrudate was then barium ion-exchanged and washed with water (initial pH approximately 5) to an equilibrium potassium ion concentration in the final wash of 23 ppm by weight (final pH of 7.5).

The resulting material was then pore-fill impregnated, etc. as in Example 1.

Example 7

Silica-bound Catalyst - Not of this Invention

A similar catalyst preparation was made as in Example 6, except that deionized water was used to wash the barium exchanged zeolite instead of water of pH 5, the final pH was 9.62 instead of 7.5, and the potassium ion concentration of the final wash solution was 40 ppm instead of 23 ppm.

Example 8

Silica-bound Catalyst in Accord with this Invention

Following the procedure of Example 6, an extrudate was formed utilizing 20% by weight silica derived from Ludox TM AS-40 silica and 80% potassium L-extrudate. This extrudate was calcined at 705° C. in flowing air.

This extrudate was then barium ion-exchanged and washed with deionized water (initial pH approximately 5) to an equilibrium potassium ion concentration in the final wash of 156 ppm by weight (final pH of 9.19).

The resulting material was then pore-fill impregnated, etc. as in Example 1.

The activity and water sensitivity of the above catalysts are shown in Table I. These properties were determined in microreactor tests under the conditions described hereinabove under Detailed Description.

TABLE I

| Catalyst of Example No. | Pool Conversion, % | Pool Selectivity, % | WSI |
|---|---|---|---|
| 1 | 51 | 89 | 1.4 |
| 2 | 50 | 88 | 1.4 |
| 3 | 49 | 86 | 1.0 |
| 4 | 53 | 85 | 1.0 |
| 6 | 48 | 84 | 1.3 |
| 7 | 55 | 87 | 1.3 |
| 8 | 60 | 88 | 1.0 |

What is claimed is:

1. A process for reforming feed aliphatic hydrocarbons to form aromatic hydrocarbons in a reaction zone which may be subjected to periodic exposure to more than 3 ppm water, which comprises: contacting the feed under reforming reaction conditions with a catalyst comprising a Group VIII metal, a largepore zeolite and a binder, and wherein the catalyst has a water-sensitivity index less than 1.3 and wherein the catalyst is prepared by a method comprising contacting the zeolite with a binding enhancement agent prior to binding the zeolite.

2. A process in accordance with claim 1 wherein the water-sensitivity index is less than 1.1.

3. A process in accordance with claim 1 wherein the water-sensitivity index is less than or equal to about 1.0.

4. A process in accordance with claim 2 wherein the sulfur content of the feed is less than 100 ppb.

5. A process in accordance with claim 2 wherein the sulfur content of the feed is less than 50 ppb.

6. A process in accordance with claim 1 wherein the zeolite is L-zeolite.

7. A process in accordance with claim 6 wherein the L-zeolite has been ion-changed with barium, calcium or strontium.

8. A process in accordance with claim 7 wherein the L-zeolite has been ion-exchanged with barium.

9. A process in accordance with claim 6 wherein the binder is silica.

10. A process in accordance with claim 6 wherein the binder is alumina.

11. A process in accordance with claim 6 wherein the binder is silica alumina.

12. A process in accordance with claim 11 wherein the zeolite is L zeolite and the binder is silica.

13. A process in accordance with claim 12 wherein the binding enhancement agent is aluminum nitrate.

14. A process in accordance with claim 13 wherein the catalyst crush strength is at least 1.8 lbs/mm.

15. A process in accordance with claim 1 wherein the zeolite is an L-zeolite which has been ion-exchanged with potassium or barium and then washed at a pH above 7 in water having an alkali or alkaline earth metal concentration greater than 50 ppm by weight based on the weight of water.

16. A process in accordance with claim 15 wherein the alkali or alkaline earth metal is potassium, sodium or barium.

17. A process in accordance with claim 15 wherein the concentration of the alkali or alkaline earth metal in the equilibrium wash water is 100 to 250 ppm.

18. A process in accordance with claim 16 wherein washing is carried out at a pH above 8.

19. A process in accordance with claim 16 wherein the alkali metal in the wash water is potassium.

20. A process in accordance with claim 16 wherein the sulfur content of the feed is less than 50 ppb.

21. A process in accordance with claim 16 wherein washing is carried out at a pH between 9 and 11.

22. A process in accordance with claim 16 wherein the zeolite is bound with silica, alumina or silica/alumina prior to the washing.

23. A process in accordance with claim 16 wherein the catalyst is prepared by a pore fill impregnation of the bound zeolite with a platinum component using a solution containing platinum followed by drying and calcining without intervening washing after the pore fill addition of the platinum.

24. A process in accordance with claim 1 wherein the binder is alumina which has been subjected to only mildly acidic peptization.

25. A process in accordance with claim 24 wherein the peptization of the alumina is carried out with less than 0.10 gram of nitric acid, or equivalent, per gram of alumina.

26. A process for dehydrocyclization of aliphatic hydrocarbons to aromatics in a reaction zone which may be subjected to periodic exposure to trace amounts of water, which comprises feeding to the reaction zone feed hydrocarbons containing no more than 100 ppb sulfur and contacting the feed hydrocarbons under dehydrocyclization reaction conditions with a catalyst comprising platinum, and L-zeolite and a binder, and wherein the catalyst has a water-sensitivity index less than 1.1.

27. A process in accordance with claim 26 wherein the binder is silica and the catalyst is prepared by a method comprising contacting the zeolite with a binding enhancement agent prior to binding the zeolite.

* * * * *